United States Patent
Hacker et al.

(10) Patent No.: US 8,527,092 B2
(45) Date of Patent: Sep. 3, 2013

(54) MOVEMENT CONTROLLER FOR ELASTIC ROBOT STRUCTURES

(75) Inventors: Jens Hacker, Markgroningen (DE); Bjoern Schoell, Asperg (DE); Alexander Meissner, Stuttgart (DE)

(73) Assignee: Dürr Systems GmbH, Beilstein (DE)

( * ) Notice: Subject to any disclaimer, the term of this patent is extended or adjusted under 35 U.S.C. 154(b) by 705 days.

(21) Appl. No.: 12/601,745

(22) PCT Filed: May 7, 2008

(86) PCT No.: PCT/EP2008/003674
§ 371 (c)(1),
(2), (4) Date: Nov. 24, 2009

(87) PCT Pub. No.: WO2008/141730
PCT Pub. Date: Nov. 27, 2008

(65) Prior Publication Data
US 2010/0198405 A1  Aug. 5, 2010

(30) Foreign Application Priority Data
May 24, 2007  (DE) .................. 10 2007 024 143

(51) Int. Cl.
 G05B 19/04 (2006.01)
 G05B 19/18 (2006.01)
(52) U.S. Cl.
 USPC ............ 700/251; 700/1; 700/189; 700/245; 700/246; 700/248; 700/249; 700/250; 700/252
(58) Field of Classification Search
 None
 See application file for complete search history.

(56) References Cited

U.S. PATENT DOCUMENTS

| 5,357,424 A * | 10/1994 | Kakizaki et al. ............... 700/29 |
| 6,126,092 A * | 10/2000 | Cote et al. ..................... 239/422 |
| 6,519,860 B1 * | 2/2003 | Bieg et al. ....................... 33/503 |
| 2004/0093119 A1 * | 5/2004 | Gunnarsson et al. ......... 700/245 |

FOREIGN PATENT DOCUMENTS

| DE | 69829559 | 11/1998 |
| DE | 102004008406 A1 | 12/2004 |
| DE | 10342471 | 4/2005 |
| DE | 102004056861 A1 | 6/2006 |

(Continued)

OTHER PUBLICATIONS

EP1515209 English Translation.*

(Continued)

Primary Examiner — Ian Jen
(74) Attorney, Agent, or Firm — Bejin VanOphem & Bieneman PLC

(57) ABSTRACT

A predetermined robot path includes a plurality of path points defined by spatial coordinates. Spatial coordinates of the individual path points are converted in accordance with inverse robot kinematics into corresponding axis coordinates, the axis coordinates representing the position of the individual robot axes at respective path points. Axis-related controllers are actuated for individual robot axes in accordance with converted axis coordinates. Axis-related drive motors in individual robot axes are actuated by at least associated axis-related controllers. Path correction values are determined for individual path points on the robot path in accordance with a dynamic robot model, the path correction values taking account of the elasticity, friction, and/or inertia of the robot. Corrected axis coordinates are determined for the individual path points from uncorrected axis coordinates of individual path points and path correction values. The axis-related controllers are actuated with at least corrected axis coordinates.

13 Claims, 8 Drawing Sheets

(56) References Cited

FOREIGN PATENT DOCUMENTS

| | | |
|---|---|---|
| EP | 1173801 A1 | 1/2002 |
| RU | 2193480 | 11/2002 |
| WO | WO 2006/056349 | 6/2006 |
| WO | WO-2006056349 A1 | 6/2006 |

OTHER PUBLICATIONS

Torque Vector; Dec. 1999.*

Wells, Robert L—IEEE article entitled "A study of path errors due to servo dynamics and link flexivbilities in a two-coordinate robotic manipulator" Oct. 17, 1993 pp. 705-709.

Eugene Tung et al, Article entitled "Low velocity friction compensation and feedforward solution based on repetitive control " Jun. 1991 pp. 2615-2620.

Kermani, M.R., Patel, R.V., Moallem, M; Article entitled Friction Identification in Robotic Manipulators: Case Studies: IEEE Conference Aug. 2005, pp. 1170-1175.

Prufer, M., Wahl, F.M.: Article entitled "Friction Analysis and Modelling for Geared Robots" PFAC Symposium on Robot control, Sep. 1994, pp. 485-490.

Kostic, D., de Jaeger, B., Steinbuch, M., Hensen, Ron: Article entitled "Modeling and identification for High-Performance Robot control: An RRR-Robotic Arm Case Study", presented at IEEE Nov. 2004 pp. 904-919.

Gomes, S.C.P, Chretien, J.P. Article entitled "Dynamic Modelling and Friction Compensated Control of a Robot Manipulator Joint" IEEE conference May 1992 mm 1429-1435.

International Search Report Dated Oct. 10, 2008/ for PCT/EP2008/003674.

Wells, R.L., "A study of path ererors due to servo dynamics and link flexibilities in a two-coordinate maniulator," Systems, Man and Cybernetics, 1993, citation page.

Russian Decision to Grant Appl. No. RU 2009148022/02.

* cited by examiner

US 8,527,092 B2

MOVEMENT CONTROLLER FOR ELASTIC ROBOT STRUCTURES

CROSS-REFERENCE TO RELATED APPLICATIONS

This application is a National Phase application claiming the benefit of International Application No. PCT/EP/2008/003674, filed May 7, 2008, which claims priority to German Patent Application No. DE 10 2007 024143.9, filed May 24, 2007, the complete disclosures of which are hereby incorporated in by reference in their entireties.

FIELD

The present disclosure relates to a control method for a multiaxial robot, in particular for a painting robot, according to the main claim.

BACKGROUND

DE 103 42 471 A1 reveals a robot control system for a multiaxial painting robot, which moves a Tool Centre Point (TCP) along a predetermined robot path. This known robot control system may take account of and compensate mechanical elasticities of the individual robot axes, in order to improve the positioning accuracy of the painting robot. In this instance, the individual robot axes of the painting robot are actuated in each case by one axis controller, the mechanical elasticity of the painting robot being taken into account in that the deviation of the axis controller of a relatively flexible robot axis acts, in the context of axially overlapping coupling, on an axis controller of a relatively rigid axis.

This known robot control system has already proven advantageous, but it is desirable, in particular in the case of highly dynamic robot movements, to take even better account of mechanical elasticities of the painting robot and to provide even better compensation, in order to increase positioning accuracy.

A robot control system is known from US 2004/0093119 A1 which corrects friction-related positioning errors of the robot in the case of drive regulation in the individual robot axes, the predetermined robot path not being modified however. The positioning accuracy of the robot is not therefore improved to a sufficient degree by this robot control system, this being particularly true in the case of highly dynamic operation of the robot.

Reference should also be made with regard to the prior art to DE 10 2004 056 861 A1; "Proceedings of the 2005 IEEE Conference on Control Algorithms", Aug. 28-31, 2000, pp. 1170-1175; "Proceedings of IFAC Symposium on Robot Control", Sep. 19-21, 1994, pp. 485-490; DE 698 29 559 T2; DE 10 2004 008 406 A1; "Proceedings of the 1992 IEEE Conference on Robotics and Automation", May 1992, pp. 1429-1435; "IEEE Transactions on Control Systems Technology", Vol. 12, No. 6, November 2004, pp. 904-919 and EP 1 173 801 B1. However, in this prior art, too, the positioning accuracy of the robot is unsatisfactory.

Accordingly, there is a need in the art for an improved control method for a multiaxial robot which compensates elasticities of the robot as well as possible, in order to improve the positioning accuracy of the robot.

BRIEF DESCRIPTION OF THE DRAWINGS

Various advantageous aspects of the present disclosure are explained in greater detail below with reference to the Figures together with the description of the exemplary illustrations below. In the drawings.

DETAILED DESCRIPTION

Figure 1:
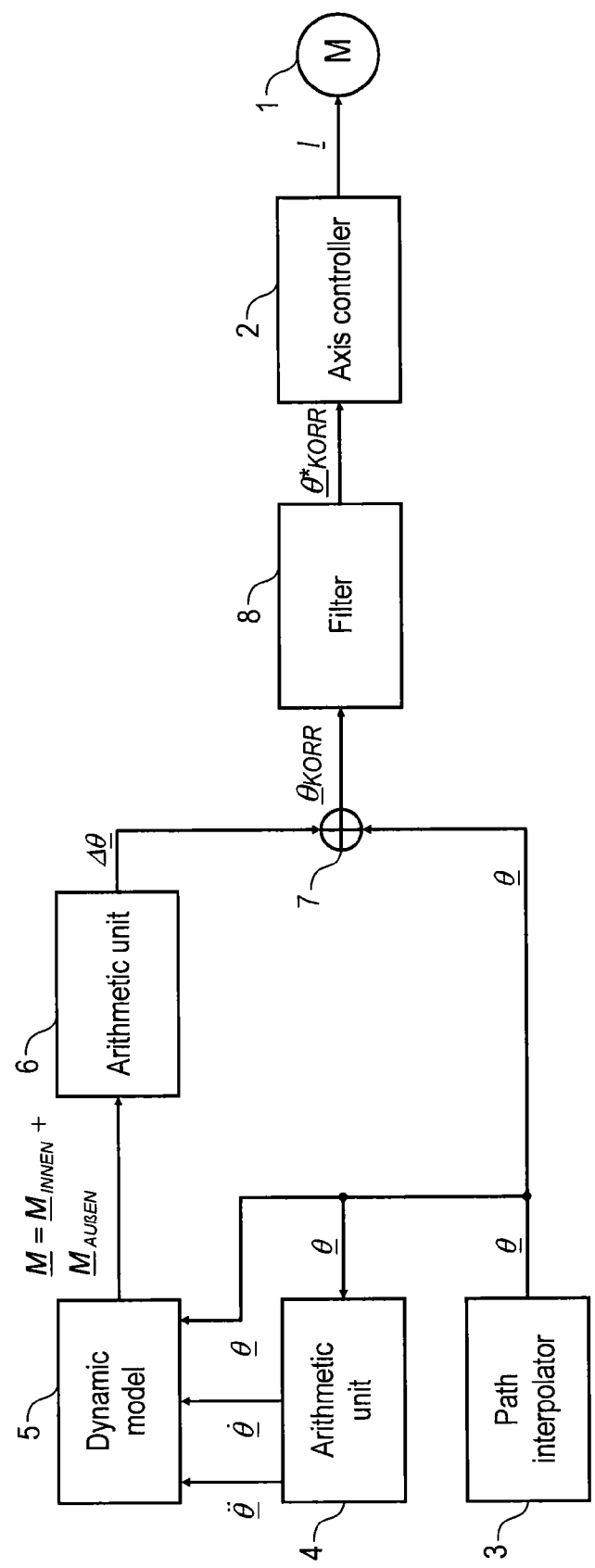
FIG. 1 is a schematic representation of a robot control system according to one exemplary illustration for actuating a multiaxial painting robot.

Various exemplary illustrations are provided herein for calculating path correction values when controlling a multiaxial robot along a predetermined robot path, which values take account of the elasticity, friction and/or inertia of the robot, such that the actuation of the robot with an accordingly corrected robot path compensates the dynamic positioning errors (e.g. overshoot, elastic deformation of the robot axes).

In the context of the control method according to the exemplary illustrations, a robot path may be predetermined for a reference point of the robot, such as for example the "Tool Centre Point (TCP)", by a plurality of path points which are intended to be traversed by the reference point. The individual path points on the robot path may be defined by spatial coordinates which define the position of the individual path points in the three spatial directions. For example, a set of coordinates or a position vector with three coordinates may be predetermined for each path point, these indicating the position of the respective path point in a three-dimensional Cartesian coordinate system.

The spatial coordinates of the individual path points of the predetermined robot path may then be converted for the purposes of the control method according to the exemplary illustrations in conventional manner in accordance with inverse robot kinematics, into corresponding axis coordinates, the axis coordinates representing the position of the individual robot axes at the respective path points. Conversion of the spatial coordinates into the corresponding axis coordinates in accordance with inverse robot kinematics may be performed by any known method for doing so. The converted axis coordinates of the individual path points then may advantageously assume the form of a position vector in a system of axis coordinates.

The converted axis coordinates of the individual path points may then serve to actuate axis-related controllers for the individual robot axes, which may be performed in any manner that is convenient, such as for example from the above-cited patent application DE 103 42 471 A1. Accordingly, the content of DE 103 42 471 A1 is hereby expressly incorporated by reference in its entirety.

The axis-related controllers for the individual robot axes may then actuate the drive motors in the individual robot axes in such a way that the reference point (for example the Tool Centre Point) successively traverses the individual path points of the predetermined robot path.

In addition to the above-described conventional method steps, according to the exemplary illustrations, path correction values for the individual path points on the robot path may be calculated according to a dynamic robot model, the path correction values taking account of the elasticity, friction and/or inertia of the robot and thereby allowing compensation of dynamic positioning errors.

The path correction values may then serve in calculation of corrected axis coordinates for the individual path points of the predetermined robot path. For example, for calculation of the corrected axis coordinates the path correction values may simply be added to the uncorrected axis coordinates of the respective path points, such that the path correction values form an offset.

Finally, the individual axis-related controllers may then be actuated with the corrected axis coordinates, the dynamic positioning errors thereby being compensated.

In one exemplary illustration, a dynamic robot model is provided for calculating the "internal" forces and torques for the moved masses of the robot, and the calculation may advantageously take place in real time ("online") in accordance with a rigid body model.

In this example, the control method may advantageously provide for internal torque values to be calculated from the uncorrected axis coordinates of the individual path points in accordance with the dynamic robot model, the internal torque values representing the internal torque of the drive motors and of the associated robot axes. For example, the internal torque values calculated in this way may take account of a static friction component, a viscous friction component and/or the mass inertia of the drive train of the individual robot axes, as will be described in further detail below.

In this exemplary illustration, the path correction values may then be calculated from the internal torques and the known external torques, the elasticity of the individual robot axes being taken into account by regarding the individual robot axes in the simplest case as elastic torsion springs of zero order. The path correction values may then be obtained, in accordance with a linear interrelationship, from a predetermined torsion spring constant and the total torques as the sum of the internal torques and the external torques.

For the purposes of the exemplary illustrations, the internal torque values may include a static friction term $M_{fric,stat}$, which represents speed-independent friction which acts in the direction of rotation of the respective drive motor and may be calculated for example from the sign of the uncorrected axis coordinates of the path points and a predetermined static friction constant. The static friction term $M_{fric,stat}$ may here be calculated according to the following formula from the static friction constant fista and the uncorrected axis coordinates $q_i$, the index i indicating the respective robot axis:

$$M_{fric,stat,i} = f_i^{sta} \cdot sgn(\dot{q}_i)$$

Furthermore, the internal torque values calculated in the context of the dynamic robot model may comprise a dynamic friction term $M_{fric,dyn}$, this being a linear term which acts proportionally to the rotational speed of the respective drive motor. For example, the dynamic friction term may be calculated according to the following formula from a dynamic friction constant $f_i^{vis}$ and the first time derivative $\dot{q}_i$ of the uncorrected axis coordinates of the path points:

$$M_{fric,dyn,i} = f_i^{vis} \cdot \dot{q}_i$$

Finally, the internal torque values calculated in the context of the dynamic robot model may also comprise an inertia term $M_{inert}$ which represents the mechanical inertia of the drive train of the respective robot axis and is proportional to the angular acceleration of the respective drive motor. The inertia term $M_{inert}$ may here be calculated from the second time derivative $\ddot{q}_i$ of the uncorrected axis coordinates of the path points and an inertia constant $J_i$ in accordance with the following formula:

$$M_{inert} = J_i \cdot \ddot{q}_i$$

In one exemplary illustration, the temperature dependence of the above-mentioned friction terms is taken into account. To this end, in the context of the exemplary control methods the ambient temperature is measured, the model parameters (for example the static friction constant, the dynamic friction constant and the inertia constant) then being read out of a parameter memory as a function of the measured temperature. The path correction values are then calculated with the read-out model parameters of the dynamic robot model, i.e. taking account of the current temperature. This temperature adjustment of the model parameters of the dynamic robot model offers the advantage that temperature dependencies of the mechanical behavior of the robot may be taken into account in the context of the exemplary control methods.

The "internal" parameters $f_i^{sta}$, $f_i^{vis}$ and $J_i$ may advantageously be determined experimentally for each axis by a special driving program for the robot and an optimisation method. During this driving, the motor torques arising may be read from the drives and the motor torques which result purely from the masses of the robot are generally simultaneously calculated. The internal parameters may be calculated from the resultant torques difference using a "least squares method". The set of parameters determined applies for the current temperature of the motor/gear train of the respective axis. The operating temperature of the robot may be subdivided into discrete steps. The robot is generally gradually heated by being driven. Once the next temperature level has been reached, the above-mentioned identification method is performed to determine the parameters $f_i^{sta}$, $f_i^{vis}$ and $J_i$ and the associated temperature may be generally simultaneously stored. In this way, the associated set of parameters is obtained for each axis for each temperature step. In subsequent operation the current temperature value is read out cyclically for each axis, e.g., at regular time intervals, and then the associated set of parameters is put online.

After the above-described calculation of the internal torque values in accordance with the dynamic robot model, the path correction values may then, as already mentioned above, be calculated from the internal torque values and the known external torque values, wherein this calculation may take place in the simplest case in accordance with a simple interrelationship between torque and angle of rotation if in each case an elastic torsion spring of zero order is taken as the underlying model for the individual robot axes. However, the path correction values may be calculated from the internal torque values by means of a P element, of a PT1 element and/or of a PT2 element, which allows for generally optimum modeling.

In the exemplary illustrations, the axis coordinates, corrected with the path correction values, of the individual path points may be advantageously filtered prior to actuation of the axis-related controller, in order to smooth the axis coordinates. During this filtering an average or a weighted average may be formed, for example. In addition, filtering may be carried out by a phase-lead filter or by a Finite Impulse Response (FIR) filter. Other possible filter types for filtering the corrected axis coordinates prior to actuation of the axis-related controllers are bandpass filters or low-pass filters.

It should additionally be mentioned that the various exemplary illustrations are not restricted to the above-described control methods, but rather from a hardware standpoint also comprises a robot control system which is suitable for carrying out this control method and is set up accordingly.

Finally, the present disclosure also comprises a multiaxial robot, in particular a painting robot, which is actuated by such a robot control system in accordance with the exemplary control methods.

The drawing in FIG. 1 shows a simplified, schematic diagram of a robot control system according to an exemplary illustration for actuating a multiaxial painting robot.

Here the individual robot axes are driven by drive motors 1, for example as provided in the above-cited patent application DE 103 42 471 A1.

The drive motors 1 in the individual robot axes are in this exemplary illustration actuated with a predetermined current value I in each case by an axis controller 2 for the individual robot axes, the underlined values here and hereinafter in each case indicating vectors which contain in each case one component for the individual robot axes.

In addition, the exemplary robot control system comprises a path interpolator 3, which receives as input variable a predetermined robot path through a plurality of path points, the individual path points being intended to be traversed by the Tool Centre Point (TCP) of the painting robot and in each case being defined by a three-dimensional position vector, the individual components of the position vector representing the spatial coordinates of the path points in a three-dimensional, Cartesian coordinate system.

The path interpolator 3 may then convert the spatial coordinates of the individual path points of the predetermined robot path in accordance with inverse robot kinematics into axis coordinates, which represent the position of the individual robot axes of the painting robot at the respective path points of the predetermined robot path. The path interpolator thus outputs a multidimensional position vector $\underline{\theta}$, the number of dimensions of the position vector $\underline{\theta}$ corresponding to the number of robot axes, such that the individual components $q_i$ of the position vector $\underline{\theta}$ represent the positions of the individual robot axes of the painting robot at the respective path points.

The position vector $\underline{\theta}$ may then be supplied to an arithmetic unit 4, which calculates the first time derivative $d\underline{\theta}/dt$ and the second time derivative $d\underline{\theta}^2/dt^2$ of the position vector $\underline{\theta}$, i.e. the speed and acceleration in the axis coordinate system.

Furthermore, the robot control system may include a dynamic robot model 5 implemented in software, which calculates from the axis-related position vector $\underline{\theta}$, the first time derivative $d\underline{\theta}/dt$ and the second time derivative $d\underline{\theta}^2/dt^2$ of the position vector $\underline{\theta}$ a torque vector $\underline{M}$, which consists of the sum of the external torque $\underline{M}_{EXT}$ and the internal torque $\underline{M}_{INT}$, the internal torque $\underline{M}_{INT}$ taking account of the friction and inertia in the individual robot axes and being calculated in accordance with the following formula:

$$M_{INT,i} = f_i^{sta} \cdot sgn(q_i) + f_i^{vis} \cdot \dot{q}_i + J_i \cdot \ddot{q}_i$$

The torque vector $\underline{M} = \underline{M}_{INT} + \underline{M}_{EXT}$ may then be supplied to an arithmetic unit 6, which calculates from the torque vector $\underline{M}$ a path correction vector $\Delta\underline{\theta}$, which is then used for path correction, as will be described in detail below. The path correction vector $\Delta\underline{\theta}$ is here calculated from the torque vector $\underline{M}$ in accordance with the following formula:

$$\Delta\theta_i(s) = \frac{M_i}{s^2 \cdot \theta + s \cdot D + K}$$

The uncorrected position vector $\underline{\theta}$ may then be supplied, together with the path correction vector $\Delta\underline{\theta}$, to an adder 7, which calculates a corrected position vector $\underline{\theta}_{CORR}$, the corrected position vector $\underline{\theta}_{CORR}$ compensating dynamic path deviations in the robot control system.

The corrected position vector $\underline{\theta}_{CORR}$ may then be supplied to a filter 8, which filters the position vector $\underline{\theta}_{CORR}$ in order to smooth the position vector $\underline{\theta}_{CORR}$. The filter 8 thus outputs a smoothed position vector $\underline{\theta}^*_{CORR}$, the individual components of the corrected and smoothed position vector $\underline{\theta}^*_{CORR}$ being supplied to the individual axis controllers 2 for the individual robot axes.

Figure 2A:
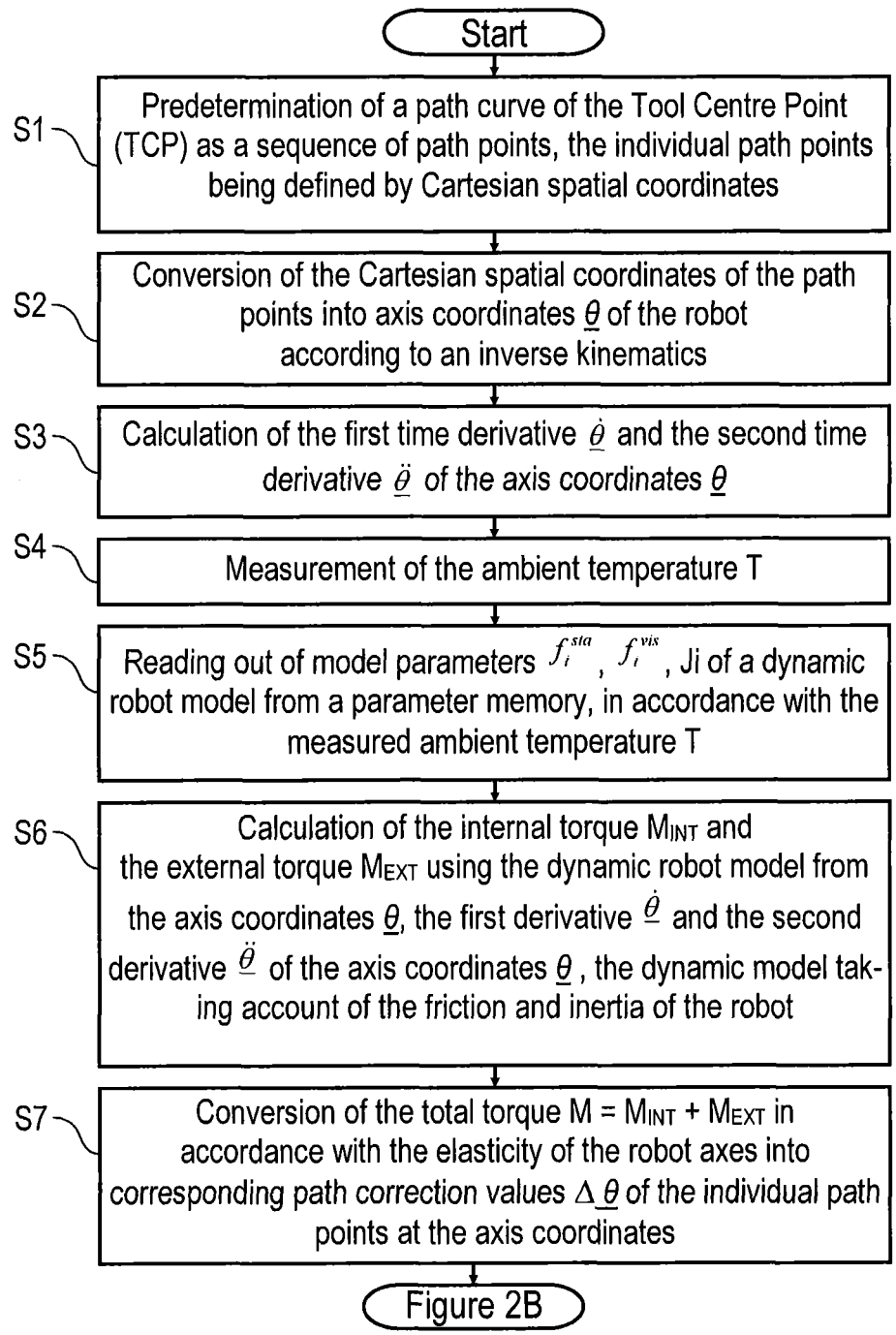
FIGS. 2A and 2B: show the control method according to an exemplary illustration in the form of a flow chart.
Figure 2B:
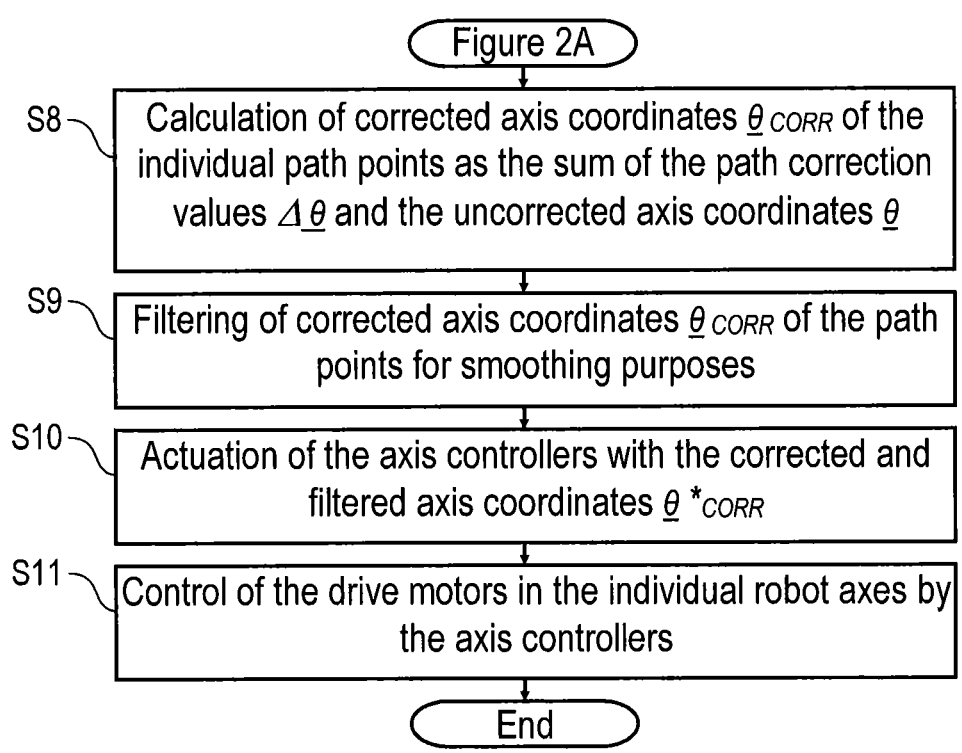

The flow chart in FIGS. 2A and 2B clarifies an exemplary operating method, e.g., in accordance with the above described exemplary robot control system.

In a first step S1, a path curve of a plurality of path points may be predetermined for the path interpolator 3, which path points are intended to be successively traversed by the Tool Centre Point (TCP) of the painting robot, the individual path points of the predetermined path curve being defined by Cartesian spatial coordinates.

The spatial coordinates of the individual path points are then converted, e.g., by the path interpolator 3, in a step S2 into corresponding axis coordinates $\underline{\theta}$, the axis coordinates representing the position of the individual robot axes at the respective path points.

In a further step S3, the arithmetic unit 4 may calculate the first time derivative $d\underline{\theta}/dt$ and the second time derivative $d\underline{\theta}^2/dt^2$ of the position vector $\underline{\theta}$ at the axis coordinates.

In addition, in a step S4, the ambient temperature T may be measured, since the dynamic robot model 5 may be temperature-dependent, as will be described in detail below.

In step S5, model parameters of the dynamic robot model 5 may be read out from a parameter memory as a function of the previously measured ambient temperature T, the model parameters being a static friction constant $f_i^{sta}$, a dynamic friction constant $f_i^{vis}$ and an inertia constant $J_i$.

In a step S6, the total torque $\underline{M}$ may then be calculated in the dynamic robot model 5 as the sum of the internal torque $\underline{M}_{INT}$ and the external torque $\underline{M}_{EXT}$, thereby accounting for friction and inertia of the robot.

In step S7, the total torque $\underline{M}$ calculated in accordance with the dynamic robot model may then be converted, in accordance with the elasticity of the robot axes into corresponding path correction values $\Delta\underline{\theta}$ for the individual path points at the axis coordinates.

In step S8, the corrected axis coordinates of the individual path points may be calculated, e.g., in that the adder 7 adds the path correction values $\Delta\underline{\theta}$ to the uncorrected axis coordinates $\underline{\theta}$.

In addition, in step S9, the corrected axis coordinates may be filtered by the filter 8 for smoothing purposes.

Moreover, in step S10, the individual axis controllers 2 may be actuated with the corrected and filtered axis coordinates $\underline{\theta}^*_{CORR}$.

In step S11, regulation of the individual drive motors 1 in the individual axles may be effected, e.g., by the axis controllers 2.

Figure 3:
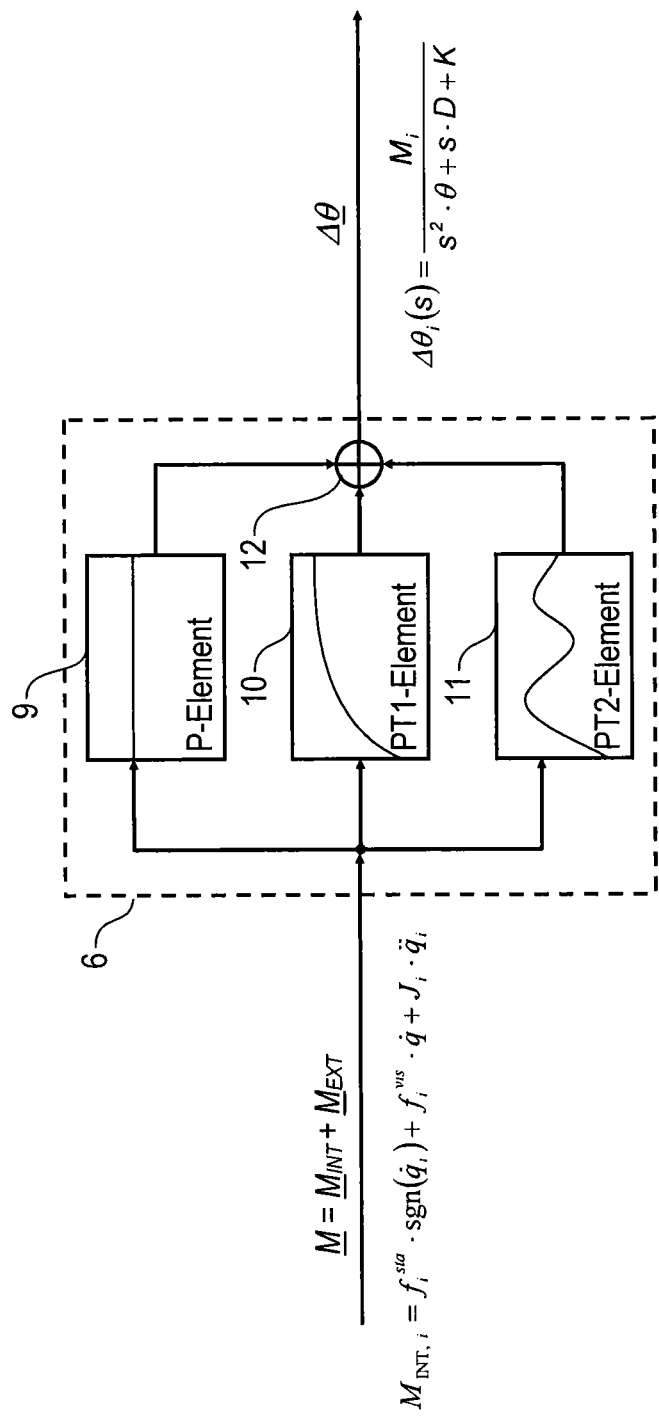
FIG. 3 shows the arithmetic unit of the robot control system of FIG. 1 for calculating the path correction values from the internal torque values.

FIG. 3 shows an exemplary schematic illustration of the arithmetic unit 6 of FIG. 1, which as described above may calculate the path correction vector $\Delta\underline{\theta}$ from the torque vector $\underline{M}$. In this example, the arithmetic unit 6 consists of a P element 9, a PT1 element 10, a PT2 element 11 and an adder 12, the P element 9, the PT1 element 10 and the PT2 element 11 receiving the torque vector $\underline{M}$ on the input side and being connected on the output side with the adder 12, which adds the output signals of the P element 9, of the PT1 element 10 and of the PT2 element 11, in order to calculate the path correction vector $\Delta\theta$.

The P element may be implemented in any known manner that is convenient. The P element 9 thus may have a proportional transmission characteristic.

The PT1 element 10 may likewise be implemented in any known manner convenient, and may have a proportional transmission characteristic with first order lag.

Finally, the PT2 element 11 may also be implemented in any known manner convenient, and may have a proportional transmission characteristic with second order lag.

The individual components $\Delta\theta_i$ of the path correction vector $\Delta\theta$ may thus be calculated by the arithmetic unit 6 in accordance with the following transmission function:

$$\Delta\theta_i(s) = \frac{M_i}{s^2 \cdot \theta + s \cdot D + K}$$

Figure 4:
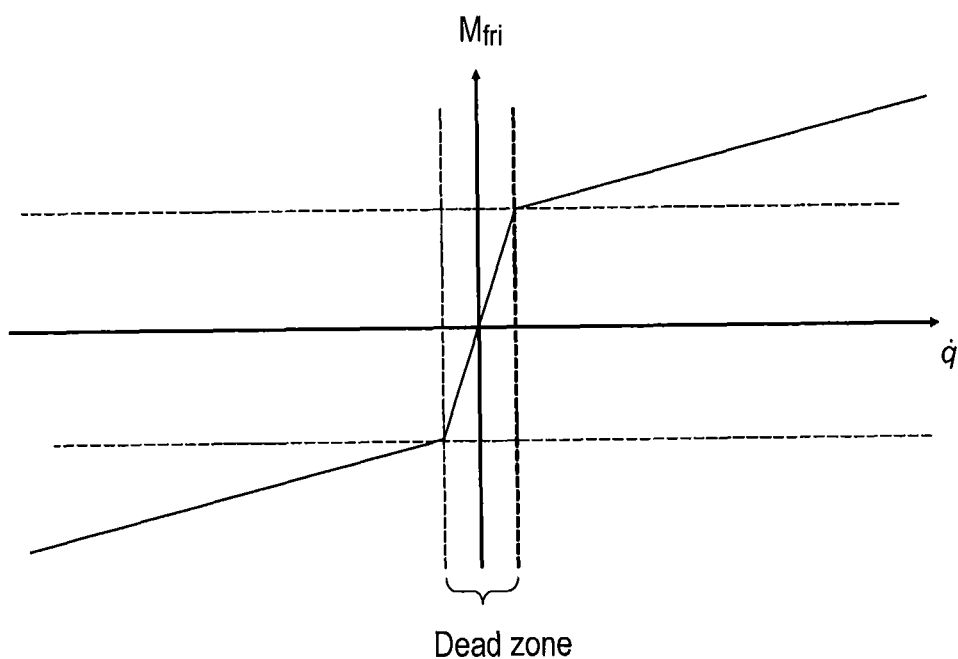
FIG. 4 shows a diagram for calculating internal friction as a function of the time derivative of the axis coordinates.

FIG. 4 shows a diagram for calculating the internal torque $M_{fri}$ as a function of the first time derivative $\dot{q}$ of the axis coordinates. It is apparent therefrom that the friction torque $M_{fri}$ is treated separately in a dead zone around the zero point, e.g., by linearly interpolating the values of the friction torque $M_{fric}$ between the start and end of the dead zone.

Figure 5:
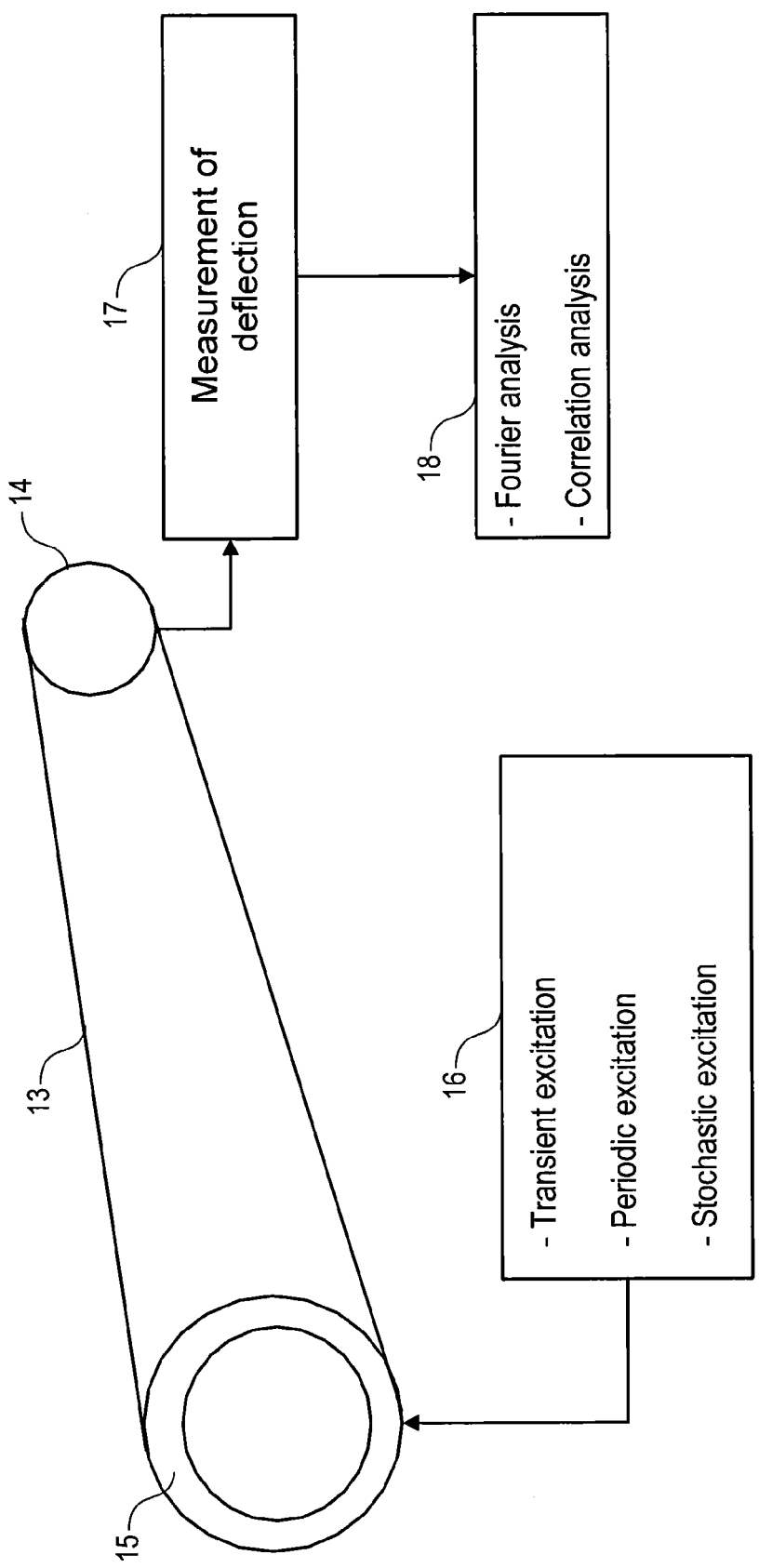
FIG. 5 is a schematic representation for determining the model parameters of the dynamic robot model in the context of a calibration process.

FIG. 5 shows a simplified exemplary representation of an exemplary calculation of the above-mentioned model parameters of the dynamic robot model. The Figure shows, by way of example, just a single robot axis 13 with an end effector 14 and a gear connection 15.

The gear connection 15 may be excited transiently, periodically or stochastically via an excitation unit 16 by means of a drive motor.

The deflection may then be measured at the end effector 14 by a measuring unit 17 and forwarded to an evaluation unit 18, the evaluation unit 18 subjecting the measured deflection of the end effector to Fourier analysis or correlation analysis, in order to calculate the mechanical transmission characteristic of the robot axis 13.

Figure 6:
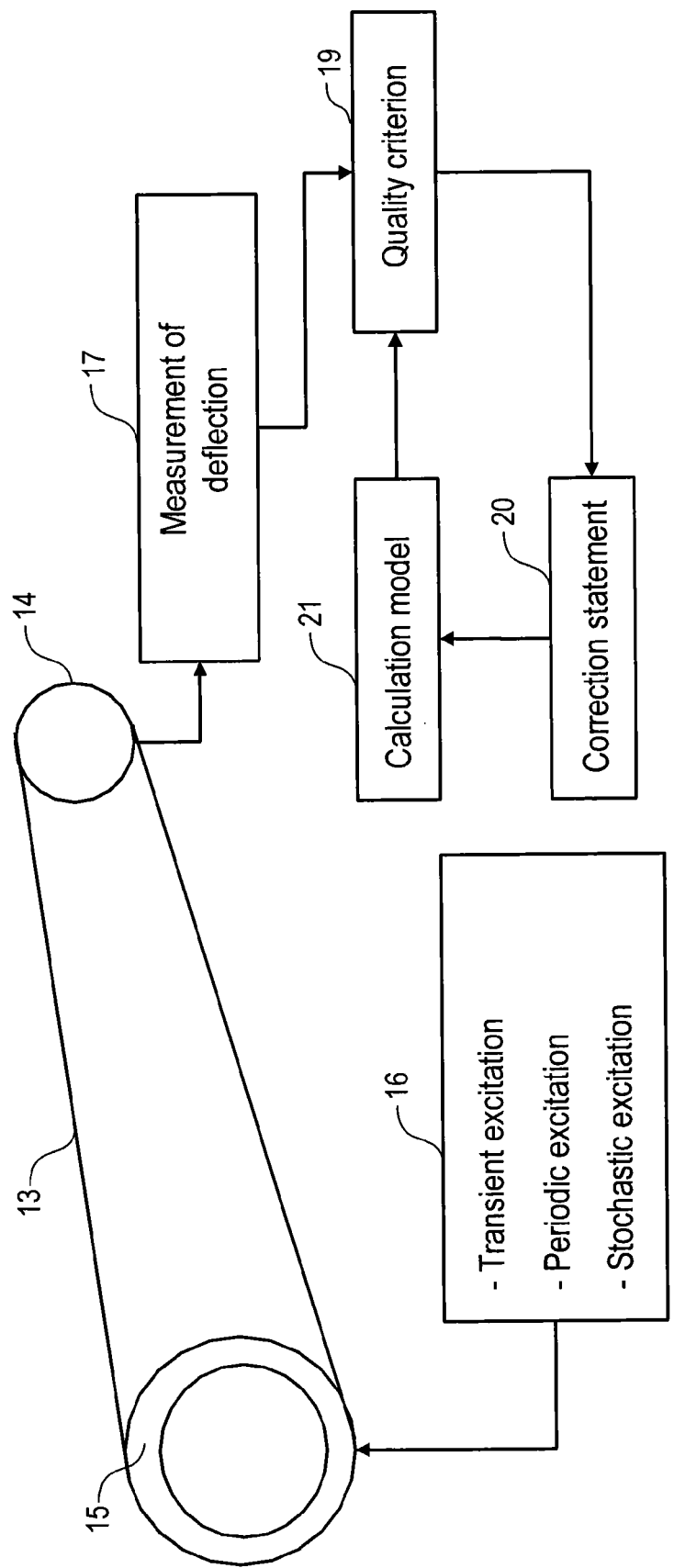
FIG. 6 shows a modification of the representation of FIG. 5, in which the model parameters are calculated in a different way

The exemplary representation in FIG. 6 largely matches the representation in FIG. 5, such that reference is made to the description relating to FIG. 5 to avoid repetition.

A particular feature of this exemplary illustration consists in the fact that the measuring unit 17 is connected on the output side to an assessment unit 19, which compares the measured deflection with a quality criterion and adjusts the correction statement in a correction unit 20 accordingly. The correction unit 20 is in turn connected to a calculation unit 21, which influences the quality criterion in the assessment unit 19.

Figure 7:
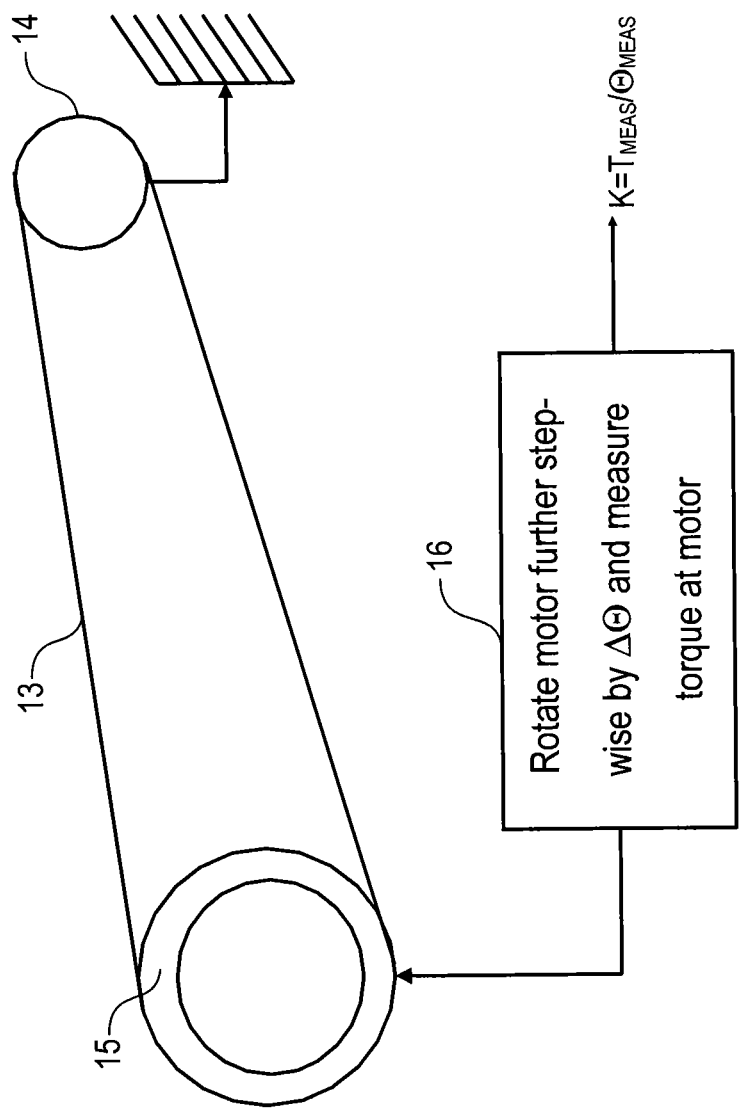
FIG. 7 shows a modification of the representation of FIG. 5, in which a robot axis is braked to a standstill to determine the model parameters of the dynamic robot model.

Finally, FIG. 7 shows a modification of the exemplary representation of FIG. 5, in which the end effector 14 has been braked to a standstill. The excitation unit 16 here rotates the drive motor stepwise onwards and, in so doing, measures the torque at the drive motor, in order to calculate the spring constant of the axis 13 therefrom.

The invention is not limited to the embodiments described above. Rather, a plurality of variants and modifications are possible, which likewise make use of the concept of the invention and therefore fall under the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A control method for a multiaxial robot, comprising:
predetermining a robot path through a plurality of path points, which are intended to be traversed by a reference point of the robot, the individual path points each being defined by spatial coordinates,
converting the spatial coordinates of the individual path points in accordance with inverse robot kinematics into corresponding axis coordinates, the axis coordinates representing the position of the individual robot axes at the respective path points,
actuating axis-related controllers for the individual robot axes in accordance with the converted axis coordinates,
actuating axis-related drive motors in the individual robot axes by at least the associated axis-related controllers,
and further comprising:
computing a torque vector M based on a sum of actual torque values associated with the multiaxial robot, including known external torque $M_{EXT}$ and an internal torque $M_{INT}$ of the multiaxial robot, the internal torque $M_{INT}$ representing the internal torque of the drive motors and the associated robot axes,
determining path correction values for the individual path points on the robot path in accordance with a dynamic robot model, the path correction values based at least in part on the torque vector and taking account of the elasticity and/or friction and/or inertia of the robot,
determining corrected axis coordinates for the individual path points from uncorrected axis coordinates of the individual path points and the path correction values, and actuating the axis-related controllers with at least the corrected axis coordinates.

2. The control method according to claim 1, further comprising:
   determining the external torque $M_{EXT}$ and the internal torque $M_{INT}$ from the uncorrected axis coordinates of the path points in accordance with the dynamic robot models.

3. The control method according to claim 2, further comprising establishing the internal torque $M_{INT}$ as including the following components:
   a) a static friction term, the static friction term being determined from the sign of the uncorrected axis coordinates of the path points and a static friction constant, and
   a) a dynamic friction term, the dynamic friction term being determined from the first time derivative of the uncorrected axis coordinates of the path points and a dynamic friction constant, and
   c) an inertia term, the inertia term being determined from the second time derivative of the uncorrected axis coordinates of the path points and an inertia constant.

4. The control method according to claim 1, further comprising:
   a) measuring an ambient temperature,
   b) receiving from a parameter memory model parameters of the dynamic robot model corresponding to the measured ambient temperature, and
   c) determining the path correction values with the read-out model parameters of the dynamic robot model.

5. The control method according to claim 3, wherein the temperature-dependently read-out model parameters comprise the following quantities:
   a) the static friction constant and
   b) the dynamic friction constant and
   c) the inertia constant.

6. The control method according to claim 2 wherein the path correction values are calculated from at least one of the internal torque value and the external torque value by at least one of:
   a) a P element
   b) a PT1 element and
   c) a PT2 element.

7. The control method according to claim 2 wherein the path correction values are determined, taking account of the elasticity of the robot axes, from at least one of the internal torque value and the external torque value.

8. The control method according to claim 1 further comprising the following step:
   filtering the corrected axis coordinates of the path points prior to actuation of the axis-related controllers.

9. The control method according to claim 8, wherein the corrected axis coordinates are filtered by a filter type selected from a group consisting of the following filter types:
   a) an average filter,
   b) an average filter configured to determine a weighted average,
   c) a phase-lead filter,
   d) a FIR filter,
   e) a bandpass filter, and
   f) a low-pass filter.

10. The control method according to claim 1 wherein the path correction values are added to the uncorrected axis coordinates of the path points on correction.

11. A robot control system, which is configured to perform a control method according to claim 1.

12. A robot, having a robot control system according to claim 11.

13. The robot according to claim 12, wherein the robot is a painting robot.

* * * * *